Aug. 13, 1935.　　　P. S. MORGAN　　　2,010,876
FLUID METER
Filed June 3, 1932　　　4 Sheets-Sheet 1

INVENTOR.
Porter S. Morgan
BY Albert R. Henry
ATTORNEYS.

Aug. 13, 1935.   P. S. MORGAN   2,010,876
FLUID METER
Filed June 3, 1932   4 Sheets-Sheet 2
Fig. 5.
Fig. 2.
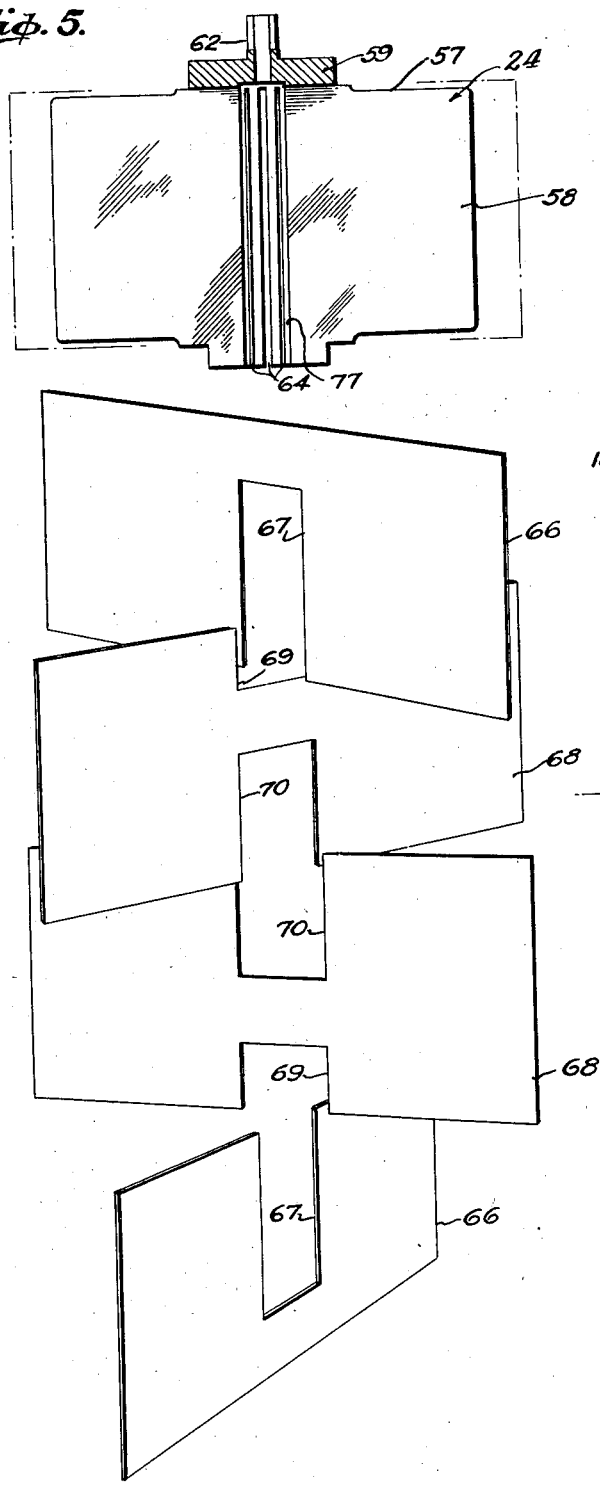
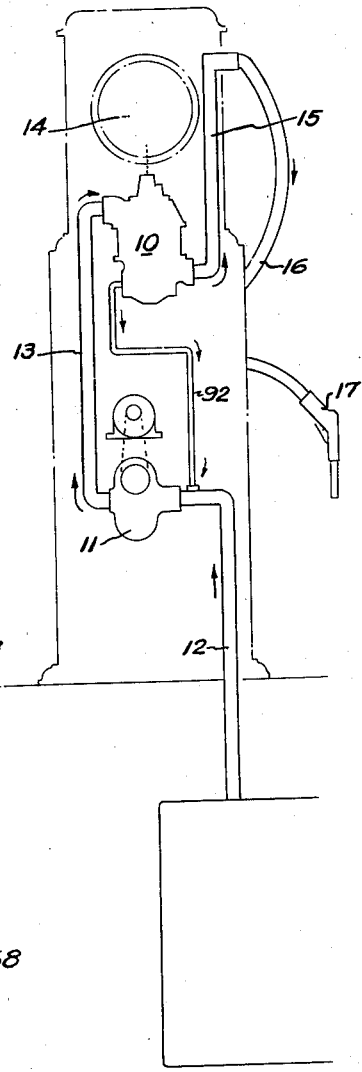
INVENTOR.
Porter S. Morgan
BY
ATTORNEYS.

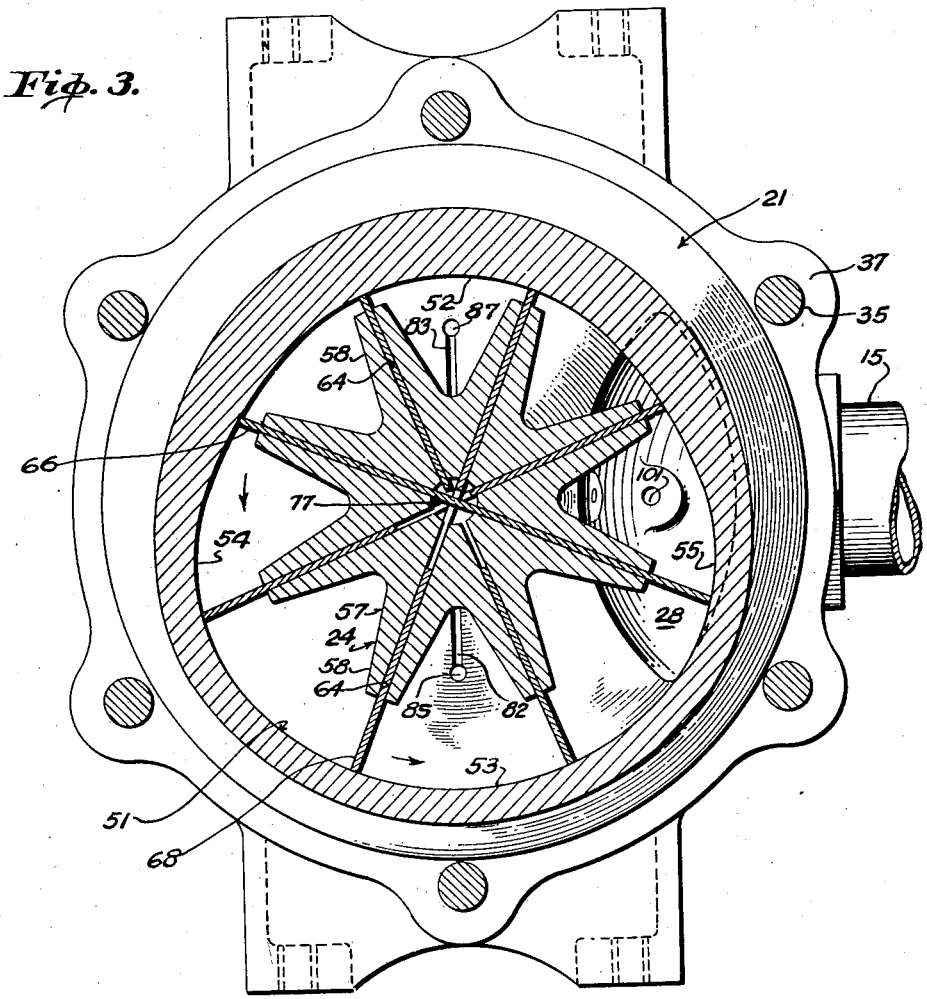

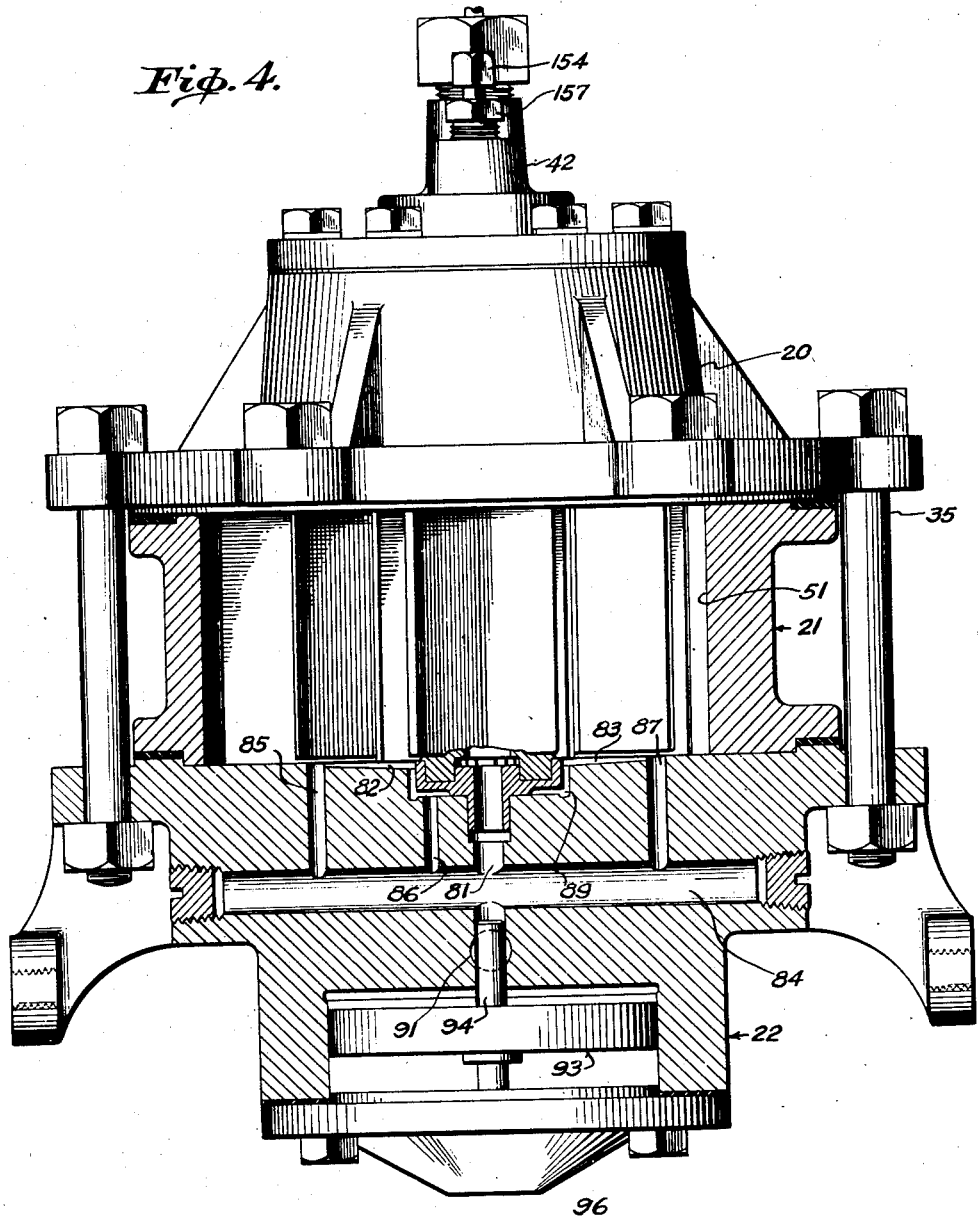

Patented Aug. 13, 1935

2,010,876

UNITED STATES PATENT OFFICE 2,010,876

FLUID METER

Porter S. Morgan, Norwalk, Conn., assignor, by mesne assignments, to Liberty Share Corporation, Buffalo, N. Y., a corporation of New York Application June 3, 1932, Serial No. 615,166

7 Claims. (Cl. 73—37)

This invention relates to meters for measuring the passage of fluids and it has particular reference to a meter which is accurate under all normal or service conditions.

The invention contemplates the provision of a metering device containing a fluid actuated member formed to provide a plurality of pockets or fluid receiving spaces which successively receive loads of fluid from a pressure source for ultimate delivery to an output passage. This device may be subject to inaccuracies caused by the leakage of fluid through the necessary clearances between the stationary and moving parts thereof, since such leakage volumes escape from the inlet to the outlet without actuating the movable elements and therefore represent unmetered quantities of fluid. The present invention accordingly also provides means for correcting this undesirable condition by successively establishing communication between the loads of fluid during movement, and further provides a control or equalizing device. This device contains a valve which is responsive to pressures both in the meter output passage and in the pockets of the actuated member, and it acts to bring the pressures in both to a state of equilibrium by permitting the escape of the leakage volumes of fluid and the subsequent directing of such volumes to their source.

The invention will also be found to reside in certain structural features of the metering device and their cooperation with the control device as more completely set forth in the following specification and drawings of a preferred embodiment of the principles, wherein:

Fig. 2 is a diagrammatic illustration, showing the application of the meter to a gasoline dispenser;

Fig. 3 is a cross section on the line 3—3 of Fig. 1;

Fig. 4 is a side elevation of the device with the rotor housing and lower head shown in section; and, Fig. 5 shows the parts of the rotor unit in the order of assembly, the blades being shown in perspective and the spider in section.

Figure 1:
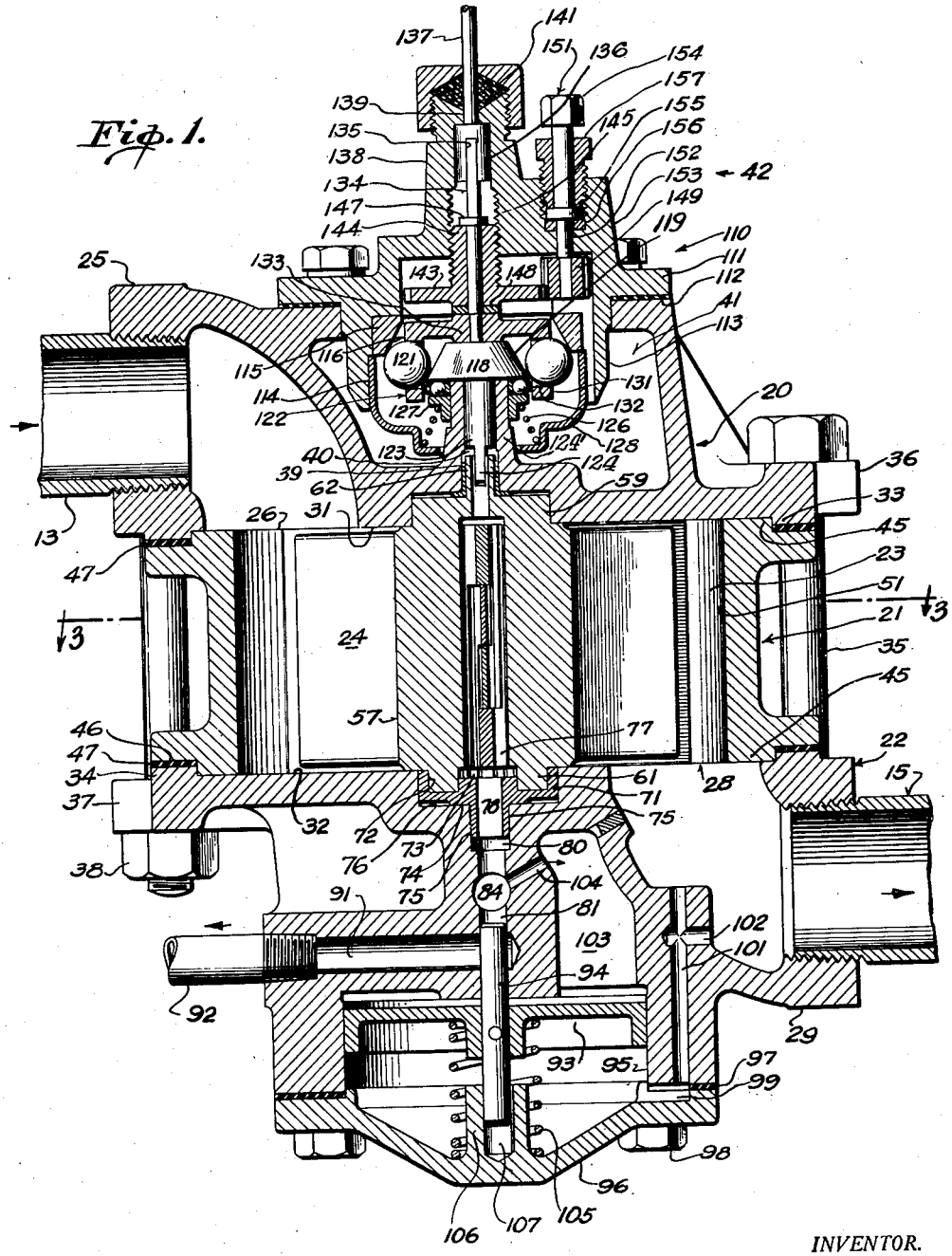
Fig. 1 is a vertical section through a meter.

The drawings illustrate a metering device 10, which for exemplary purposes is shown applied to a gasoline dispensing system (Fig. 2) wherein a motor driven pump 11 withdraws gasoline from a suitable tank through a suction pipe 12 and delivers the same to a pipe 13 and to the input of the meter. The liquid passing through the meter 10 causes the actuation of certain movable parts therein which in turn actuate an indicating mechanism 14, which visually indicates or records the number of units of gasoline passing through the meter. The measured gasoline is discharged through the output of the meter to a pipe 15, whence it enters a dispensing hose 16 for ultimate disposal through the nozzle 17 thereof.

The metering device 10 comprises a housing formed of an upper head 20, a rotor casing 21, and a lower head 22 (Figs. 1 and 4). All three of these members cooperate to form a rotor chamber 23 wherein a rotor 24 is mounted for movement on a vertical axis. The upper head 20 is formed with a spud 25 adapted to receive the supply pipe 13, and which communicates with the chamber 23 through an input port 26, also formed in the head 20. The liquid causes the actuation of the rotor 24 in a manner hereinafter more fully set forth, and passes through a port 28 and spud 29, formed in the lower head 22, to its destination through the pipe 15.

More specifically, both the upper and lower heads 20 and 22 are flanged castings having planar faces, 31 and 32 respectively, and raised peripheral pads, 33 and 34 respectively, between which the rotor casing 21 is received and clamped by bolts 35, extending through suitable bosses 36 and 37 in the heads 20 and 22, to receive nuts 38.

The face 31 of the upper head 20 contains a central counterbore 40, the upper wall of which is drilled to receive a bushing 39 for receiving the upper spindle of the rotor 24. The upper portions of this head are formed with a chamber 41 for receiving a calibrating unit 42 which is hereinafter described.

The rotor casing 21 is formed with opposite parallel faces 45 having shoulder portions 46 adapted to receive gaskets 47 and the peripheral pads 33 and 34 of the upper and lower heads to provide a fluid tight seal. The casing is formed with a vertical inner wall 51 which is roughly eccentric to the true center of the member and in addition is so formed as to be of constant diameter at all angles of rotation. The curves forming this wall consist of an arcuate or dwell surface 52 arranged intermediate the inlet and outlet ports and an opposed arcuate surface 53 of a greater radius. These curves are each of approximately ninety degrees arc, and their extremities are connected by connecting curved surfaces 54 and 55, which are complementary harmonic curves of a type suitable both to provide for a minimum rate of change of curvature and to retain the diametrical characteristics above referred to.

The rotor 24 is provided with a plurality of vanes of equal length which are adapted to contact both the upper and lower faces of the chamber 23 and the vertical inner wall 51 at all angles of rotation. This unit is formed of a spider 57 having a plurality of radiating arms 58 and upper and lower hubs 59 and 61, the hub 59 having an axial extension forming a spindle 62 which rotates in the bushing 39 of the head 20. The spindle 62 is attached to the driven member of the indicating mechanism 14 by means of a slot formed therein as hereinafter described. The spider is diametrically slotted through all of the arms 58 to form guideways 64 for the rotor vanes, and these slots cut through the lower hub 61 and terminate at the upper hub 59, which remains unslotted and thus supports the underlying slotted portions of the spider structure.

The rotor vanes are four in number and comprise thin rectangular members which are centrally notched to form an interlocking structure (Fig. 5), for example, the vane 66 contains a marginal notch 67, the depth of which is three quarters of the width of the member and is adapted to engage over the remainder of the vanes. The second vane 68 is notched at opposite margins, the narrower notch 69 being adapted to engage over the unnotched portion of the vane 66 while the remaining notch 70 is substantially one half the width of the member and receives the remaining vanes. The remaining two vanes are preferably duplicates of the vanes 66 and 68 arranged in inverted position in this assembly. Each of the vanes is inserted in a slot guideway 64 in the order above described, wherein the longitudinal edges are aligned to a common plane since each of the vanes contacts the top wall of its slot in the upper hub 59.

After the insertion of the vanes, the lower unsupported segments of the spider are secured against springing by a flanged centering member 71 which is provided with a circular groove 72 in its face. The outer wall of this groove engages about the hub 61 and the inner wall engages within a central counterbore 73 in the spider. The member 71 is also formed with a bearing pad 74 and a depending spindle portion 75 which respectively engage in the lower wall of a bore 76 in the lower head 22 and a bearing counterbore 80 therein.

Both the spider 57 and the centering member 71 are provided with communicating central drilled passages 77 and 78 respectively, the former passage being intersected by the guideways 64 and also being adapted to receive any fluid leakage therefrom for delivery into the passage 78 and thence to a vertical recovery passage 81 as hereinafter more specifically pointed out.

The face 32 of the lower head 22 is provided with drain grooves or channels 82 and 83 which are diametrically aligned on a line intermediate the input and output ports (Figs. 3 and 4). These channels are adapted to drain into a cross passage 84 through vertically drilled holes 85, 86 and 87. The central hole 86 is drilled through the bottom of the bore 76 and it is in communication with the channels 82 and 83 through slots 89 formed in the wall of this counterbore. The cross passage 84 intersects the recovery passage 81 and thus establishes communication between such passage and the channels 82 and 83 in the rotor chamber. A bleed passage 91 (Fig. 1) is drilled in the lower head below the passage 84, in communication with the recovery passage 81, and it is adapted to receive liquid therefrom for delivery to the bleed conduit 92 which communicates with the suction pipe 12 (Fig. 2).

Means are provided for controlling the escape of liquid from the recovery passage 81 to the bleed passage 91, which comprise a fluid pressure responsive device preferably in the form of a piston 93 and an attached valve stem 94 adapted to enter the passage 81 to close the same. This piston is mounted in a vertical chamber 95 of the lower head 22, which chamber is capped by a head 96 and gasket 97, secured by means of the bolts 98.

The lower face of the piston 93 is subjected to fluid pressure from the outlet spud 29 through a groove 99 in the head 96 and communicating drilled holes 101 and 102 in the lower head 22, the hole 101 being in substantial alignment with the liquid stream from the port 28, and the hole 102 intersecting the hole 101 and being in alignment with the pipe 15. This arrangement is provided to prevent venturi or injector effects in the hole 101, in which it is desired to maintain true output pressures as hereinafter discussed, and it will be found that the hole 101 is positioned to receive the direct effect of the output stream, while the hole 102 is positioned to neutralize the stream action during surge periods of operation. The upper face of the piston is subjected to the pressure of the fluid in the recovery passage 81, such communication being obtained through a cored extension 103 of the chamber 95 and an angularly drilled hole 104 entering the passage 81. The gravitational effects of the piston assembly are balanced by a coil spring 105 which engages about a hub 106 on the head 96, and this hub is drilled to provide a lower bearing 107 for the valve stem 94.

The rotor 24 being adapted to be actuated by the incoming fluid in turn operates the indicating mechanism 14 through the medium of the interposed calibrating mechanism 42. This unit is removably mounted in the chamber 41 by means of its body member 110 which is flanged at 111 and secured to a face 112 on the upper head 21. The body 110 is formed with a depending sleeve portion 113 which is bored as indicated by the numeral 114 to receive an outer race ring 115 having a conical face 116.

A cone 118, formed with a race surface 119, is spaced from the face 116 of the race ring 115 by a plurality of drive balls 121 which engage the inner and outer race surfaces. The cone provides a drive member for a ball cage 122 which receives the balls 121 since it is provided with a shaft portion 123 having a flat terminal 124 which enters the slot of the rotor 24 to form a driving connection. The shaft portion 123 is mounted for rotation in a projecting hub 124' of the upper head 20. The cone is maintained in resilient contact with the balls 121 by a spring 126 which at its top extremity engages the lower race of a ball bearing 127 and retains the same against the cone, and at its lower extremity is retained in compressed position by a retainer cup 128 which is secured to the unit by being pressed into the bore 114.

The drive balls 121 are adjustable axially within the limits of the race faces on the cone 118 and the race ring 115 by providing means for manually adjusting the axial position of the ball cage 122. More specifically, the cage 122 is formed with a depending flange 131 in which is provided a plurality of cylindrical ball pockets 132, each of which receives a drive ball. These pockets extend radially, so that upon vertical adjustment of the cage the balls are free to move radially and yet are retained in a lateral plane in the confines of the pocket. The cage 122 is provided with a central hub 133 to which a connecting shaft 134 is secured. This shaft extends upwardly and terminates in a flat portion 135 for connection with a slotted portion 136 of a driven shaft 137, which extends to and operates the registering mechanism. The body 110 is formed with a boss 138 containing a bearing 139 for the driven shaft 137 and a gland unit 141 for sealing this shaft against escape of any fluid which might leak into the device from the meter casing.

The adjustment means for the cage 122 comprises a gear 143 having a threaded hub 144 in screw engagement with an internally threaded portion 145 of the boss 138, and also having an axial bearing portion for rotatably receiving the connecting shaft 134. This shaft is secured against axial movement relative to the gear by means of a collar 147 secured thereto and engaging the top of the hub 144, and a bearing washer 148 retained between the lower surface of the gear and the ball cage 122. A pinion 149 meshes with the gear 143, and it is secured to an adjusting shaft 151 which extends upwardly through a suitable bearing 152 in a boss 153 in the body 110, terminating in a head portion 154, by means of which the pinion may be rotated to adjust the axial position of the gear 143 and the accompanying cage 122. The pinion shaft is formed with a collar portion 155 which engages a packing member 156 in the boss 153. Upon proper adjustment of the gear 143, the pinion-gear assembly is locked by a gland nut 157 which engages about the shaft 151 and is adapted to be screwed into the boss 153 into contacting relation with the collar portion 155, thereby pressing the same against the packing member 156 to provide both a fluid-tight seal and a lock for the adjusting unit.

In operation, fluid entering the rotor chamber 23 through the input port 26 floods one or more of the pockets formed by the vanes of the rotor 24. Inasmuch as the vane area on one radius arm of each pocket is greater than the vane area on the remaining arm thereof (Fig. 3), the fluid under pressure will force the rotor assembly in a counter-clockwise direction. Following one particular rotor pocket, it will be noted that it retains a full load of fluid upon entering the major arcuate surface 53 of the rotor chamber, and is temporarily isolated from either port. Upon further movement, the vanes of this pocket are shortened upon contact with the curved cam surface 55 adjacent the output port 28 and the volumetric capacity of such pocket is therefore reduced and a portion of the fluid therein will be forced through the output port 28 for ultimate disposal through the nozzle 17 of the dispensing hose 16. It will be obvious that there will be a difference of pressure between the input and output ports, since the work expended in rotating the rotor and accompanying vernier and registering mechanism will result in the reduction of pressure in the output passage of the meter.

It is, of course, necessary to the proper operation of the rotor, that some clearances be provided, not only between the peripheral portions of the vanes and the rotor chamber 23, but also between the guideway slots 64 of the spider 57 and the faces of the vanes. These clearances may become error-inducing factors in the meter, since small portions of liquid can escape from the input port 26 through the clearance areas and into the output port 28 without effecting the movement of the rotor.

In the present invention the above mentioned leakage, or "slippage", is withdrawn from the meter at suitable points intermediate the input and output ports, or, expressed more specifically, the pressures between the intermediate or isolated vane pockets of the rotor 24 and the output passage of the meter are maintained at a state of equilibrium by means of the pressure responsive device 93.

It will be evident that fluid leaking through the clearance areas from the input port 26 to the isolated pocket or pockets traversing the major arcuate surface 53, will raise the pressure in such pocket, and subsequently cause leakage to the next pocket at the lower pressure area or outlet port. But, by establishing communication between this pocket and the top face of the piston 93 (through the drain channel 82, holes 85 and 86, cross passage 84, recovery passage 81, and hole 104) and by similarly establishing communication between the outlet passage and the lower face of the piston 93 (through groove 99 and holes 101 and 102) a differential is set up across the piston resulting in the movement thereof, and in the accompanying movement of the valve stem 94. Thus, when the pressure of the fluid in the drain channel 82 is in excess of that in the outlet passage, the piston 93 will be forced downward thus unseating the valve stem 94 and thereby permitting a flow of fluid from the drain channel 82 to the bleed conduit 92, and thence to the intake of the pump 11 through the suction pipe 12. Thus slippage volumes entering the pocket traversing the major arcuate surface 53 do not affect the volume of delivered fluid, since, due to the pressure controlling function of the piston 93, equal volumes are permitted to escape into the bleed conduit 92.

The fluid in the pocket traversing the minor arcuate surface 52 is also treated to prevent the transmission of slippage fluid to the output port. Such liquid may leak into this pocket from the input port, despite the direction of movement, and, since it is filled with fluid, a rise in pressure therein naturally results in slippage past the left hand vane. This is prevented by providing a connection between the area in question and the drain channel 82 (through drain channel 83, hole 87 and cross passage 84) resulting in the equalization of pressures in this pocket and the output passage of the meter. Similarly, the fluid which attempts to escape directly from the input to output ports through the slot guideways 64 is trapped in the central drilled passage 77 of the spider 57, which, being in communication with the drain channel 82, is therefore also maintained at the output passage pressure.

From the foregoing it will be observed that the number of pockets must necessarily be in excess of four to obtain simultaneously proper port communication with certain pockets and the isolation of the remaining pockets for the purposes specified. It will be obvious, therefore, that the rotor may be provided with six or more pockets without departing from the inventive concept.

It will be understood that the slippage above described is minute compared to the delivery volume of the meter, and in diverting this total slippage volume back to the suction side of the pump, no substantial efficiency loss is experienced in the system.

It will also be understood that the meter device, because of its automatic accuracy control, does not require adjustment within itself, regardless of operating conditions or speeds. It is, therefore, only necessary to calibrate the meter with the registering mechanism to secure an accurate record of the number of units of fluid passing through the meter. This calibrating device is in the form of an adjustable transmission, since by manipulating the adjusting shaft 151 the ratio between rotor 24 and the registering or driven shaft 137 may be varied. For example, during the factory setting on the gasoline dispensing unit, a quantity of liquid is dispensed, measured and checked against the indicated amount on the registering mechanism. If the amount indicated is less than that measured, the ratio between the rotor 24 and the shaft 137 is decreased by manipulating the adjusting shaft 151 to raise the ball cage 122. This results in the decrease of the pitch circle of the balls 121 (due to the guiding effect of the races) and, since the cone 118 is resiliently mounted, it follows the balls and maintains its driving influence. The net result of this adjustment will be the increase of the planetary speed of the balls and accompanying cage, thus the ratio between the rotor 24 and the shaft 137 may be varied within the range of the change in pitch circle diameter of the balls and may by comparative tests be brought to proper relation to the capacity of the meter.

It will be further understood that the foregoing description of a typical embodiment of the invention is intended to be exemplary of its principles, and is not intended as limiting the scope thereof, as set forth in the following claims.

I claim:

1. A fluid metering device comprising a casing provided with input and output passages, movable means in the casing formed to provide therein a plurality of fluid receiving pockets, said means being movable by the incoming fluid to transmit fluid in its pockets from the input to the output passage, and pressure responsive means for maintaining a pressure equalization in pockets remote from said passages and in the output passage.

2. A fluid metering device comprising a casing provided with input and output passages, movable means in the casing formed to provide therein a plurality of fluid receiving pockets, said means being movable by incoming fluid to receive and transmit fluid in its pockets from the input to the output passage, a bleed conduit for withdrawing limited volumes of fluid from pockets remote from said passages, and means responsive to pressure conditions in said last named pockets and said output passage for controlling the effective area of the bleed conduit.

3. A fluid metering device comprising a casing having a rotor chamber provided with input and output passages, a rotor in said chamber having a plurality of vanes, said vanes forming fluid receiving pockets within the casing, a bleed conduit in the casing in communication with portions of the chamber intermediate said passages, a piston chamber in said casing, a piston in said chamber, passage means connecting opposite sides of the piston to said intermediate portions of the rotor chamber and the output passage respectively, and valve means on said piston for closing said conduit, said valve means being movable by said piston to open said conduit when pressure in said chamber portions exceeds that of the output passage.

4. A fluid metering device comprising a casing having a rotor chamber provided with input and output passages, a rotor in said chamber comprising a spider having a plurality of slots, vanes slidably mounted in the slots of the spider and in contacting relation with the walls of the chamber, a leakage collecting orifice in the spider communicating with the slots thereof, a bleed conduit from the casing communicating with the orifice in the spider, and means responsive to pressures in the portions of the chamber intermediate the passages and to the output passage for controlling the area of the bleed conduit.

5. A fluid metering device comprising a casing having a rotor chamber provided with fluid input and output passages, a rotor in the chamber comprising a spider having a plurality of slots, vanes slidably mounted in the slots of the spider and in contacting relation to the walls of the chamber, a leakage collecting orifice in the spider communicating with the vane slots thereof, drain channels in the meter communicating with portions of the chamber intermediate the input and output passages, a recovery passage in communication with the spider orifice and said drain channels, a bleed conduit, and means responsive to pressure differential in said recovery passage and said output passage for connecting said recovery passage to said bleed conduit.

6. A fluid meter having a rotor chamber provided with input and output ports, movable means in the chamber formed to provide therein a plurality of fluid receiving pockets, said means being movable by the incoming fluid to transmit the same in its pockets from the input to the output passage, a recovery passage in the meter communicating with portions of the chamber intermediate said ports, a bleed conduit, and means responsive to pressure differential in said recovery passage and said output port for connecting said recovery passage to the bleed conduit.

7. A fluid meter comprising a casing including a chamber having top and bottom plane parallel surfaces and having an arcuate peripheral surface, a rotor spider mounted in said chamber, a plurality of blades mounted in said spider and adapted to contact the arcuate surface and to move back and forth in said spider during rotation thereof, an inlet port formed in one of said plane surfaces and an outlet port formed in the other of said plane surfaces at a point diametrically opposite said inlet port, a drain groove formed in one of said plane surfaces communicating with opposite sides of said chamber, a recovery passage in communication with said drain groove, a bleed passage exterior of said chamber and in communication with said recovery passage, a valve in the communication between said bleed and recovery passages, a pressure responsive member for operating said valve, means for transmitting fluid pressure in said recovery passage to one side of said pressure responsive member, and means communicating with said outlet port for transmitting fluid pressure therein to the opposite side of said pressure responsive member.

PORTER S. MORGAN.